United States Patent
Kramarczyk et al.

(10) Patent No.: US 11,005,831 B2
(45) Date of Patent: *May 11, 2021

(54) SYSTEM AND METHOD FOR SECURELY CHANGING NETWORK CONFIGURATION SETTINGS TO MULTIPLEXERS IN AN INDUSTRIAL CONTROL SYSTEM

(71) Applicant: Hubbell Incorporated, Shelton, CT (US)

(72) Inventors: Michael David Kramarczyk, Shelton, CT (US); Emmanuel Duvelson, Union, NJ (US); Robert Walker, West Milford, NJ (US)

(73) Assignee: Hubbell Incorporated, Shelton, CT (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/531,854

(22) Filed: Aug. 5, 2019

(65) Prior Publication Data
US 2019/0356645 A1 Nov. 21, 2019

Related U.S. Application Data

(63) Continuation of application No. 15/609,202, filed on May 31, 2017, now Pat. No. 10,375,049.

(Continued)

(51) Int. Cl.
*H04L 29/06* (2006.01)
*H04L 12/24* (2006.01)
(Continued)

(52) U.S. Cl.
CPC .............. *H04L 63/08* (2013.01); *G05B 19/05* (2013.01); *G05B 19/058* (2013.01); *H04J 3/14* (2013.01);
(Continued)

(58) Field of Classification Search
CPC ...................................................... H04L 63/08
See application file for complete search history.

(56) References Cited

U.S. PATENT DOCUMENTS 4,234,949 A * 11/1980 Gray, Jr. ................. H04L 5/245
370/212
4,466,097 A * 8/1984 Nose ....................... H04L 5/245
327/291
(Continued)

FOREIGN PATENT DOCUMENTS

WO 20040068251 8/2004
WO 2007042826 4/2007

OTHER PUBLICATIONS

International Search Report and Written Opinion mailed in corresponding application PCT/US2017/035098 dated Aug. 25, 2017 (9 pages).

(Continued)

*Primary Examiner* — Ponnoreay Pich
(74) *Attorney, Agent, or Firm* — Wissing Miller LLP (57) ABSTRACT

A secure control system includes a network of multiplexers that control end/field devices of an infrastructure system, such as an electric power grid. The multiplexers have a default secure lockdown state that prevents remote access to data on the multiplexers and prevents modification of software or firmware of the multiplexer. One or more of the multiplexers include a physical authentication device that confirms the physical proximity of a trusted individual when remote access is requested. A user accesses the network and one of the multiplexers remotely by way of login credentials. The trusted individual confirms the identity of the remote user and operates the physical authentication device connected with and in proximity to that multiplexer, thereby confirming that the remote user can be trusted to access data and reconfigure the multiplexers. The multiplexer connected (Continued)

with the physical authentication device generates a token that is passed to each of the multiplexers that the remote user needs access to. The token may specify a time period, after which, the multiplexers will reenter secure lockdown mode.

25 Claims, 7 Drawing Sheets

Related U.S. Application Data (60) Provisional application No. 62/344,944, filed on Jun. 2, 2016.

(51) Int. Cl.
*G05B 19/05* (2006.01)
*H04J 3/14* (2006.01)
*H04L 29/08* (2006.01)

(52) U.S. Cl.
CPC .......... *H04L 41/08* (2013.01); *H04L 63/0807* (2013.01); *H04L 63/0861* (2013.01); *H04L 63/107* (2013.01); *H04L 63/108* (2013.01); *H04L 67/125* (2013.01); *H04L 63/1433* (2013.01); *Y04S 40/00* (2013.01); *Y04S 40/18* (2018.05); *Y04S 40/20* (2013.01)

(56) References Cited

U.S. PATENT DOCUMENTS

| | | | | |
|---|---|---|---|---|
| 4,726,020 | A * | 2/1988 | Fino | H04W 52/0232 |
| | | | | 370/434 |
| 5,793,760 | A * | 8/1998 | Chopping | H04J 3/08 |
| | | | | 370/355 |
| 6,125,192 | A * | 9/2000 | Bjorn | G06Q 20/40145 |
| | | | | 382/124 |
| 9,666,302 | B1 * | 5/2017 | Chang | G11C 29/54 |
| 2007/0052517 | A1 | 3/2007 | Bishop | |
| 2008/0271122 | A1 * | 10/2008 | Nolan | G06F 21/32 |
| | | | | 726/4 |
| 2009/0083843 | A1 | 3/2009 | Wilkinson, Jr. | |
| 2012/0293322 | A1 * | 11/2012 | Ray | H04L 67/327 |
| | | | | 340/539.12 |
| 2014/0211657 | A1 | 7/2014 | Balasubramanian et al. | |
| 2017/0353441 | A1 * | 12/2017 | Kramarczyk | H04L 67/125 |

OTHER PUBLICATIONS

Supplementary EP Search Report mailed in EP 17807354 dated Dec. 3, 2019.

\* cited by examiner

SYSTEM AND METHOD FOR SECURELY CHANGING NETWORK CONFIGURATION SETTINGS TO MULTIPLEXERS IN AN INDUSTRIAL CONTROL SYSTEM

CROSS REFERENCE TO RELATED APPLICATIONS

This application is a continuation of co-pending application Ser. No. 15/609,202, filed May 31, 2017 (U.S. Pat. No. 10,375,049), which claims priority to U.S. Provisional Application Ser. No. 62/344,944, filed Jun. 2, 2016, both of which are incorporated herein in their entirety by reference.

BACKGROUND

Field

The present disclosure relates to security systems for authorizing access to industrial control systems, and more particularly, to security systems that provide remote access only to a trusted person.

Description of the Related Art

Critical infrastructure systems, such as electrical power distribution systems, natural gas pipelines, chemical plants, oil refineries, transportation systems, telecommunications systems, chemical manufacturing and processing plants, municipal water and sewer systems and the like often require a computerized industrial control system. Such systems need to be highly reliable to deliver continuous service to businesses and individuals. Disruption of infrastructure systems can have serious economic consequences and may put the health of individuals at risk.

Infrastructure systems may also need to be serviced and maintained. Technicians may need access components of the control system to fix problems, to maintain and upgrade software components to take advantage of developments in the state of the art, and to reconfigure the control system as required by changes to the infrastructure system. Often, engineers access these control systems remotely via an electronic communication network. Of growing concern is the risk that malicious individuals will gain access to a control system via the communication network and disrupt, or threaten to disrupt, operation of the infrastructure system.

Industrial control systems generally include an administrative computer system and a network of multiplexers that connect to industrial field/end devices. For example, for the electric utility and distribution industry, industrial field devices include circuit breakers, relays, and current and voltage sensors. These field devices and sensors provide data and receive operational commands via a programmable logic controller ("PLC") or a remote terminal unit ("RTU"). The PLC or RTU translates data signals to and from the computer system to provide operational data to the control system and to effect commands (e.g., to close or open a circuit breaker). A multiplexer may be connected with a number of field devices so that control signals from the administrative computer system can be efficiently routed to the appropriate field device. Multiplexers also provide communication circuits between nodes on the network to carry voice, data, and video signals, and provide telephone service between nodes.

Cyberattacks on industrial control systems are becoming a growing concern world-wide. Attackers may be terrorists that seek to disrupt critical infrastructure systems to incite fear and anxiety. Or attackers may seek monetary gain by making a threat that they can disrupt such systems and demand payment as a ransom. Attackers may also seek to hack into systems to gather sensitive commercial, financial, or military information.

One method an attacker may use is to launch code on the administrative computer system that either directly interferes with the infrastructure system or else steals credentials of authorized users and communicates them to the attacker. Such code may be a worm or virus attached to an email sent to employees of the company controlling infrastructure system. An employee may be induced to open a link or download a program attached to so-called "phising" emails that deliver the malicious code onto a corporate computer system. A hacker may also be able to gain access by finding an account on the system with a weak password. An attack may be made by, or aided by, a disgruntled or ill-disposed employee or ex-employee that uses knowledge of the computer system to deliberately undermine the security of the computer system by sharing his or her login credentials with a hacker or committing an attack him- or herself.

Once malicious code is launched on the corporate computer system, it acts to undermine security systems. The code may include a keyboard logger that records keystrokes of a legitimate user including the legitimate user's login information. The code then sends that information remotely to the hacker. The hacker can use the information to gain access to networks containing critical infrastructure control systems. Once the hacker gains access to the control system, the hacker can manipulate field devices to disrupt the system or demand a ransom payment.

Current methods for preventing unauthorized access to industrial control systems include firewalls that limit connections to the system to only those from trusted locations. For example, a firewall can include a list of permissible internet protocol addresses from which access can be made. This prevents hackers from accessing the network from an unauthorized computer system. However, if the hacker is able to gain access to a computer system that is part of the list of trusted sites, the hacker may be able to get past the firewall.

Most cyberattacks occur remotely. Often, the hacker is located far from the site of the attack. This reduces the chance that the hacker will be identified. An attack may be launched from a different country from where the infrastructure system is located. That country may have limited law enforcement resources that allow the attacker to remain undetected, and if discovered, allows the attacker to avoid punishment. This makes it difficult to identify the cyber attacker and limits the ability of law enforcement officials to stop an attack.

Device login credentials are often the only form of authentication in an industrial control system. If a hacker learns the device login credentials, they may gain access to control systems and to potentially sensitive data and may further degrade security measures by changing settings or adding additional pathways to entry.

SUMMARY

The present disclosure provides systems and methods for authenticating users of a computer network. According to one aspect of the disclosure, a network of multiplexers used to control field/end devices is provided. The multiplexers are connected with a corporate computer system via a firewall. The multiplexers include an authentication device that is physically connected with the multiplexer. In order for a legitimate user, for example, a communications engineer, to remotely access the network of multiplexers, a trusted individual, for example, a control room technician, must operate the authentication device physically located proximate to one of the multiplexers. The technician confirms the identity of the person seeking access to the multiplexers, for example, by telephone or by video conference. If the remote user is authentic and has a legitimate need to access the multiplexers, the technician operates the authentication device. This assures that at least one trusted individual is physically present near the multiplexer when access is authorized. Once authorization is confirmed at one multiplexer, the multiplexer generates a token that can be transmitted to other multiplexers connected via the multiplexer network, allowing the communications engineer access to parts of the system required to perform the maintenance, service, or other tasks necessary to operate the infrastructure network.

According to one aspect of the disclosure an industrial control system comprises a plurality of interconnected multiplexers forming a network. The multiplexers may communicate with and/or control an industrial field device and may be located remotely from one another. Each multiplexer has a default secure lock-down mode for preventing any change to settings of the multiplexer. The system includes a physical authentication device for indicating a physical presence of a person proximate to a control multiplexer, the control multiplexer being one of the plurality of multiplexers. The physical authentication device may comprise an identification device to identify the person proximate to the control multiplexer is a trusted individual. A network management computer is connected to the network and adapted to communicate with the multiplexers. The network management computer runs a network management application having a first user authentication module for authenticating a user and a token generator adapted to generate a token for instructing at least one selected multiplexer to exit the secure lock-down mode to allow the user to make a change to the setting of the at least one selected multiplexer. The user may be remote from the network of multiplexers and can make changes to the multiplexers via a communication network.

According to a further aspect of the disclosure, the identification device comprises a biometric sensor. The biometric sensor may be a fingerprint sensor, a retina pattern sensor, an iris pattern sensor, a vein pattern sensor, a hand geometry sensor, an earlobe geometry sensor, a voice pattern analyzer, a DNA analyzer, a handwriting analyzer, a signature analyzer, and/or a facial recognition sensor, or the like. The authentication device may also comprise a Universal Serial Bus (USB) key fob type device, a serial port device, a parallel port device, and/or a proprietary cable or the like.

According to a still further aspect of the disclosure the token generated by the token generator may be encrypted. The token may also comprise a time limit instructing the selected multiplexer to reenter secure lockdown mode after a first predetermined period of time. Each multiplexer may also comprise a default timer, the default timer controlling the multiplexer to reenter secure lockdown mode after a second predetermined period of time.

According to a still further aspect of the disclosure, a method of operating an industrial control system comprises the steps of (i) providing a plurality of interconnected multiplexers forming a network, each multiplexer having a default secure lock-down mode for preventing any change to settings of the multiplexer, (ii) providing a physical authentication device for indicating a physical presence of a person proximate to a control multiplexer, the control multiplexer being one of the plurality of multiplexers, (iii) providing a network management computer connected to the network and adapted to communicate with the multiplexers, the network management computer running a network management application having a first user authentication module for authenticating a remote user, (iv) providing a token generator adapted to generate a token for instructing at least one selected multiplexer to exit the secure lock-down mode to allow the remote user to make a change to the setting of the at least one selected multiplexer, (v) contacting the network management computer via a communication network by the remote user, (vi) operating the first authentication device to authenticate the remote user, wherein the remote user logs onto the network, (vii) establishing communication between the remote user and the person proximate to the control multiplexer, wherein the person confirms the identity of the remote user as a trusted individual, (ix) operating the physical authentication device by the person, (x) generating the token, and (xi) communicating the token to the selected multiplexers of the network, wherein the selected multiplexers exit secure lockdown mode. The token may comprise a time limit instructing the selected multiplexer to reenter secure lockdown mode after a first predetermined period of time and the method may further comprise the step of reestablishing secure lockdown mode of the selected multiplexers at the expiry of the first predetermined period of time. Each multiplexer may comprise a default timer, the default timer controlling the multiplexer to reenter secure lockdown mode after a second predetermined period of time and the method further comprise the step of reestablishing secure lockdown mode of the selected multiplexers at the expiry of the second predetermined period of time.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

For purposes of this application, the terms "code", "software", "program", "application", "software code", "software module", "module", "firmware" and "software program" are used interchangeably to mean software instructions that are executable by a processor.

Figure 1:
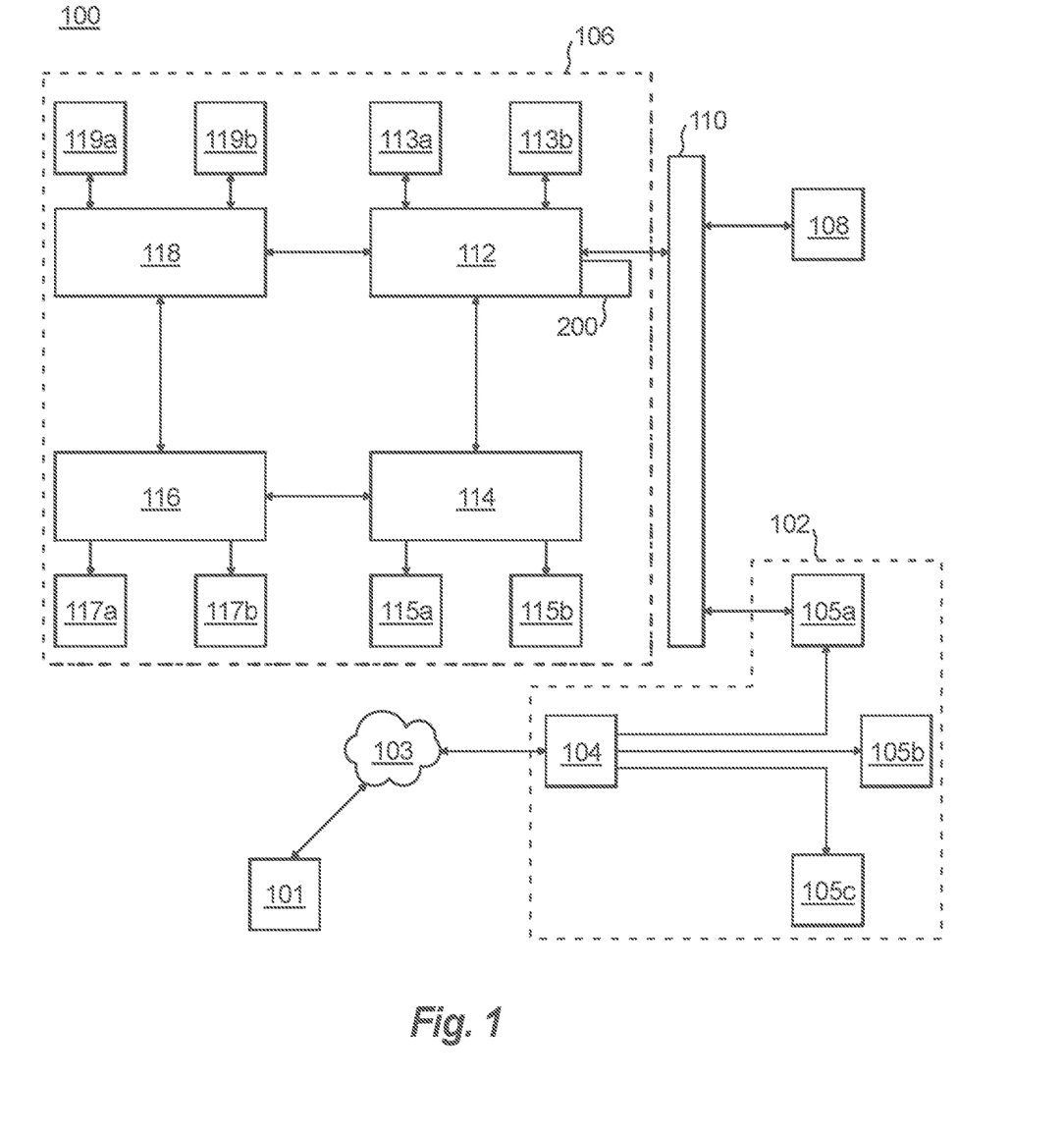
FIG. 1 is a schematic diagram showing a control system according to an embodiment of the disclosure.

FIG. 1 shows a computer network 100 according to an embodiment of the disclosure. The exemplary network environment includes a corporate network 102 comprised of a router 104 and various servers, client workstations, and other devices 105a-c. Router 104 connects the network 102 with a public network 103, which might include the Internet. A remote computer 101, which may be operated by an engineer tasked with maintaining, upgrading, or modifying the network, can communicate with the corporate network 102 via the public network 103.

Corporate network 102 is connected with an industrial control system network 106 by firewall 110. The industrial control system 106 includes a network of four multiplexers 112, 114, 116, 118 connected with one another by a data link such as an Ethernet connection. The multiplexers interface with field/end devices 113*a,b*, 115*a,b*, 117*a,b*, and 119*a,b*, respectively. Field/end devices may be data collection devices such as current, voltage, or temperature sensors, or they may be actuators such as relays or teleprotection circuit breaker actuators. In addition to field devices, elements 113*a,b*, 115*a,b*, 117*a,b*, and 119*a,b* may also include configurable interface units that enable communication such as telephony, video communication, and the like between multiplexers.

According to one embodiment of the disclosure, the multiplexers are connected in a ring configuration. A ring configuration may be advantageous in the event the communication link between any two multiplexers is lost. If a connection between any two multiplexers is lost, the signal can be routed the other way around the ring thus bypassing the lost communication link. Alternatively, the multiplexers may be connected in a grid configuration to provide multiple communication paths.

According to one embodiment, each multiplexer may be located at a different geographic location. For example, where an embodiment of the disclosure controls an electrical power grid, one of the multiplexers 112 may be located in a control room. Other multiplexers 114, 116, 118 may be located at power substations of the distribution grid.

Communication with the network of multiplexers 112, 114, 116, 118 passes through firewall 110. According to one embodiment, the firewall 110 includes a list of trusted addresses from which communications are accepted. Any communication reaching the firewall that is not include on the list is rejected and no communication session is established.

An administration computer 108 runs network management software for managing the multiplexers, collecting data from field devices connected with the multiplexers, and remotely operating field devices. As shown in FIG. 1, computer 108 is separated from both the corporate network 108 and network 106 by firewall 110. According to another embodiment, computer 108 is part of the corporate computer network 102 and separated from network 106 by firewall 110.

According to one embodiment, the computer 108, corporate network 102, and control system network 106 communicate via an Ethernet connection on a local area network (LAN), a wide area network (WAN). Each multiplexer 112, 114, 116, 118 provides an interface between the control network 106 and one or more field devices. As will be explained below, this interface may allow the network 106 to communicate with field devices using a variety of communications protocols (e.g., Ethernet, Ethernet/IP, TDM, and the like).

Figure 2:
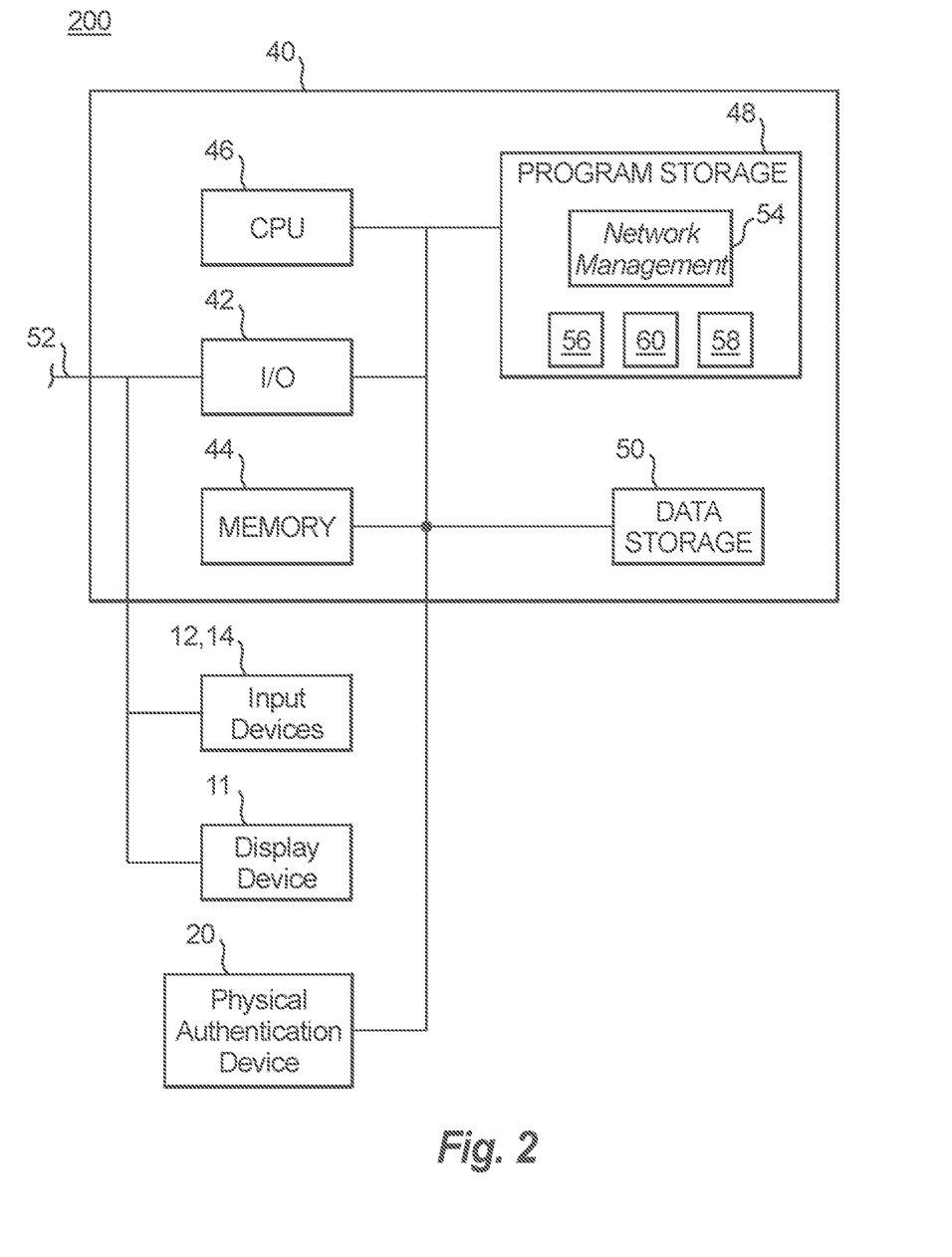
FIG. 2 is a schematic diagram showing an authentication device according to an embodiment of the disclosure.

Included in one or more of the administrative computer 108 and the multiplexers 112, 114, 116, 118 are components of an authentication system 200 shown schematically in FIG. 2. System 200 includes a computer 40 that manages various communication circuits such as those that are connected to industrial field devices 113*a,b*, 115*a,b*, 117*a,b*, 119*a,b*. The computer 40 can be a component of one or more of the multiplexers 112, 114, 116, 118. The computer 40 can also be the administrative computer 108 that manages the network of multiplexers. Software for authorizing access to multiplexers 112, 114, 116, 118, as described below, can be can be stored and run in the administrative computer 108, in each multiplexer 112, 114, 116, 118 or in a combination of the administrative computer and the multiplexers where some portion of the code is located in the administrative computer and other portions of the code are located in the individual multiplexers.

The computer 40 is connected to the communication link 52 through an I/O interface 42 such as an Ethernet interface, which receives information from and sends information over the communication link 52 to other connected devices such as the other multiplexers 112, 114, 116, 118, routers or administrative computer 108. The computer 40 includes a processor (CPU) 46, memory storage 44, which may be random access memory (RAM), read-only memory (ROM), or other electronic storage, program storage 48, which may be RAM, ROM or EEPROM, and data storage 50 such as a hard disk. These components are commonly connected to each other through a bus 53.

The program storage 48 may store, among others, a network management application 54 that interacts with the user in viewing the network and industrial field devices, and changing the settings for the same. The network management application 54 may be part of a Supervisory Control and Data Acquisition (SCADA) system to monitor, manage and operate an industrial process or municipal system, for example, an electrical power grid. The application 54 may include instructions for implementing a graphical user interface (GUI) that allows a user to interact with the system via input device 12, 14 (e.g., a keyboard and mouse) and an output device 11 (e.g., an LCD monitor). Program storage 48 also includes a token generator 56 and a token authenticator 58. Software program modules in the program storage 48 and data from the data storage 50 are transferred to the memory 44 as needed and is executed by the CPU 46 via bus 53.

System 200 also includes a physical authentication device 20. The physical authentication device 20 is electrically connected with computer 40. The authentication device 20 may be wired directly to the circuitry connected with the CPU 46 such as bus 53 or may be connected with other circuitry of the system 200 that communicates with the CPU. According to one embodiment, the physical authentication device 20 is also securely physically connected with the structure housing the computer 40. For example, authentication device 20 may be welded to the housing of the computer 40. According to another embodiment, the authentication device 20 is one of the input devices 12, 14 (e.g. a keypad or touchscreen) connected with the computer 40.

Authentication device 20 may be a push button or toggle switch on the multiplexer unit that an operator actuates as part of the authentication process. When a human operator actuates the device, this confirms that the operator is located physically near to the system 200. The authentication device 20 may also confirm the identity of the human operator. According to another embodiment, authentication device 20 is a keyboard or keypad that accepts entry of a code authenticating the user's identity. According to a further embodiment, the authentication device 20 includes a communication port connected with system 200. A port access device carried by an authorized user such as Universal Serial Bus (USB) key fob type device, a serial port device, a parallel port device, or a proprietary cable is inserted in the communication port as part of the authentication process. Passcode information entered by the user to the keypad or data on the port access device is compared with records stored in data storage 50 associated with trusted individuals.

According to a still further embodiment, the authentication device 20 includes a biometric sensor such as a fingerprint sensor, retina or iris pattern sensor, vein pattern sensor, hand geometry sensor, earlobe geometry sensor, voice pattern analyzer, DNA analyzer, handwriting or signature analyzer, facial recognition sensor, or the like. The operator provides his or her biometric characteristic, e.g., by touching a finger to the fingerprint sensor. Computer 40 compares the biometric data provided by the operator with prerecorded samples of biometric identifiers for trusted individuals stored in data storage 50. Entry of biometric data into authentication device 20 that matches the previously recorded sample confirms the identity of the trusted individual and assures that the individual is physically located near the computer 40.

In addition to system 200, multiplexers 112, 114, 116, 118 include components to interface with industrial field devices, to accept data from those devices, to configure those devices, and to communicate with other devices in the network 106. According to one embodiment of the disclosure, multiplexers 112, 114, 116, 118 include functions and components similar to EXmux® 3500 IP Access Multiplexers manufactured by RFL Electronics, Inc. to which aspects according to the present disclosure are added.

Authentication system 200 includes a secure lockdown manager 60 stored in program storage 48 and run by CPU 46. Secure lockdown manager 60 prevents any user from accessing the multiplexer 112, 114, 116, 118 or administrative computer 108 to retrieve data or to modify software unless and until the user seeking access has be authenticated, as will be described below. According to one embodiment, by default the secure lockdown manager 60 places the system in a secure lockdown mode where no access to data or modification of software is allowed.

Figure 3:
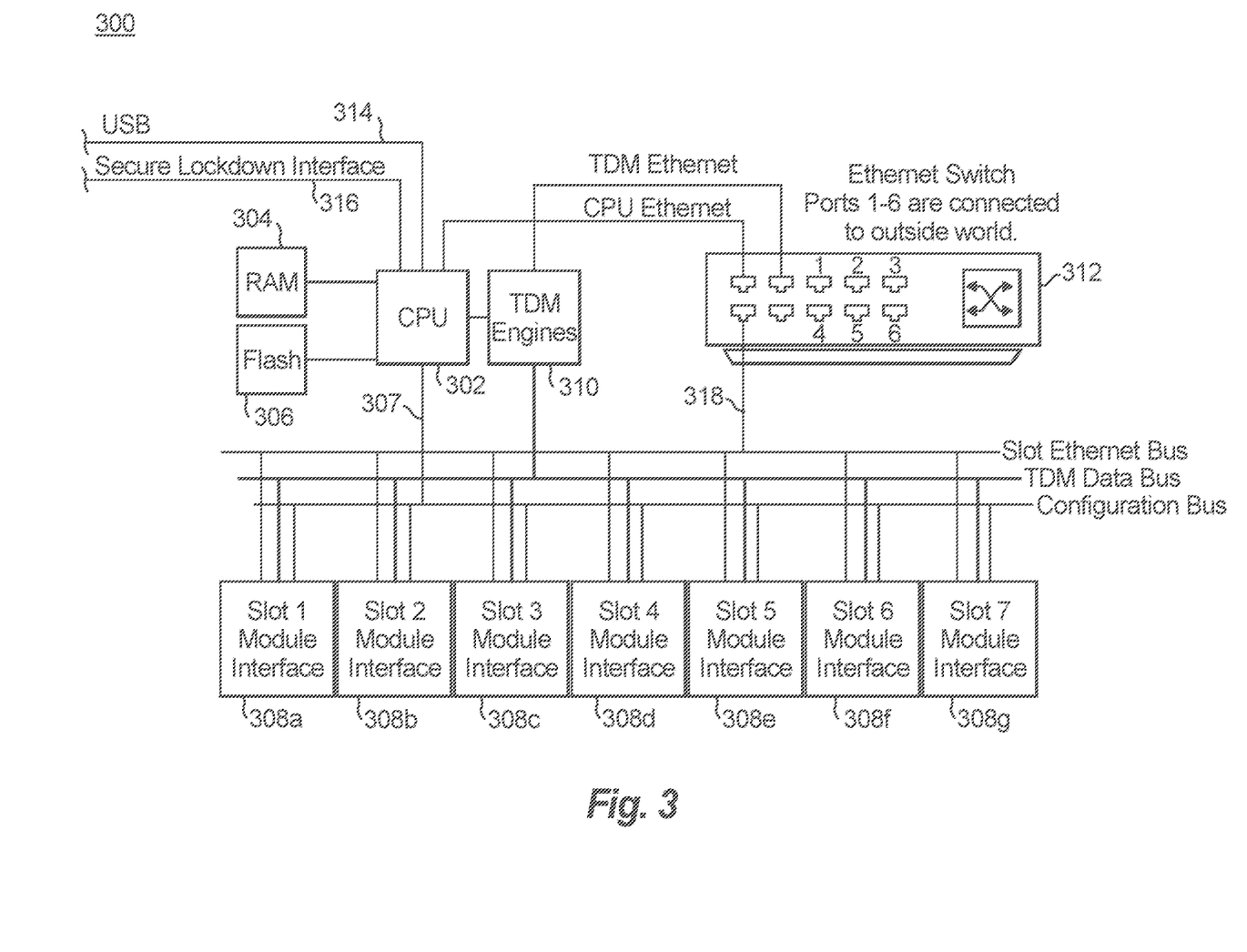
FIG. 3 is a schematic diagram of a multiplexer according to an embodiment of the disclosure.
Figure 4:
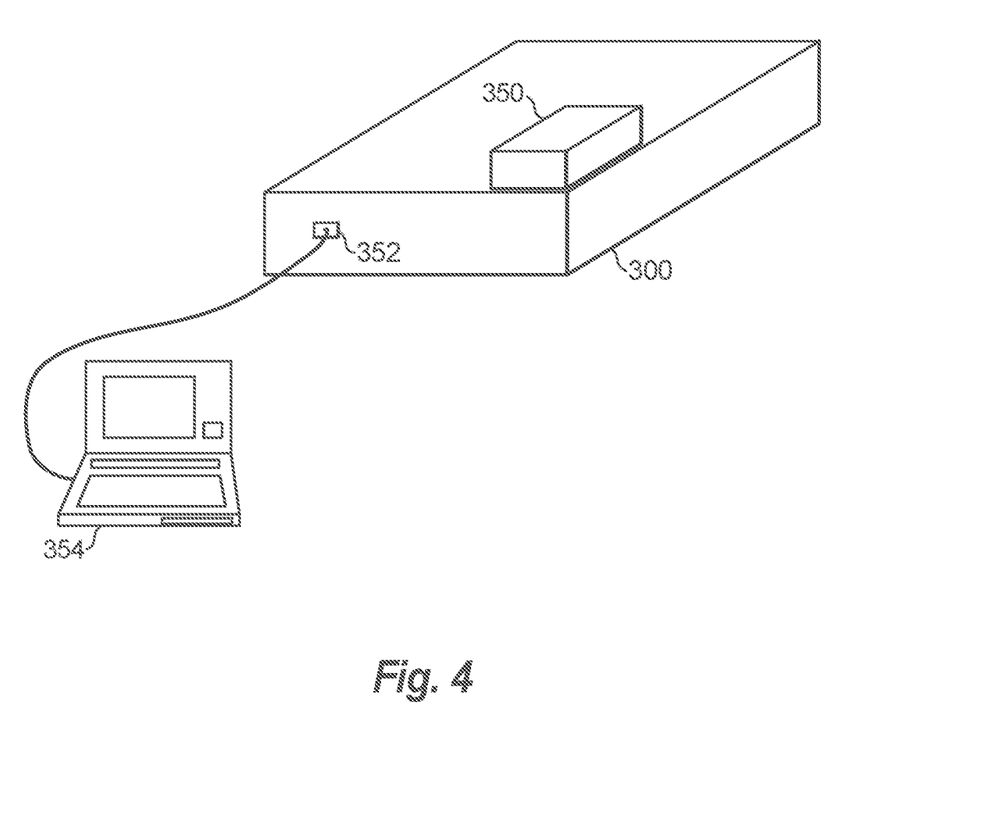
FIG. 4 shows a multiplexer according to an embodiment of the disclosure being configured using a portable a computer.

FIG. 3 shows a schematic diagram of the components of an exemplary multiplexer 300, which may be one or all of the multiplexers 112, 114, 116, and 118 of network 106. Multiplexer CPU 302 is provided with memory in the form of random access memory ("RAM") 304 and flash memory 306. RAM 304 stores program runtime data, as well as runtime data for operating system kernel such as the Linux Kernel. Flash memory 306 stores applications as well as the operating system kernel. Flash memory 306 may also store a database of settings for the Ethernet switch 312, TDM engine 310 and slots 308a-g. CPU 302 is connected with a USB port 314 that enables a technician to load data and configure the multiplexer 300, for example, using a portable computer, as shown in FIG. 4. This may include initial provisioning of the device IP Address for the multiplexer 300. CPU 302 communicates via secure lockdown interface 316 with an authentication device, such as physical authentication device 20 shown in FIG. 2.

CPU 302 communicates with slots 308a-g via configuration bus 307. Industrial field devices, such as 113a,b, 115a,b, 117a,b, 119a,b shown in FIG. 1 may be connected with the multiplexer via slots 308a-g. Communication to and from industrial field devices may use a variety of communication protocols including Common Industrial Protocol (CIP). In addition, slots 308a-d can hold configurable interface units. Interface units can be configured to communicate voice, serial and Ethernet Data communications over Ethernet networks and legacy interfaces such as T1/E1, RS-232, RS-530/422, V.35, X.21, G.703, C37.94, and various voice interfaces, along with native IP solutions.

TDM engine 310 manages time division multiplexing ("TDM") of communication signals with field devices and interface units connected via slots 308a-g via TDM bus 314. TDM engine 310 converts TDM signals to Ethernet Packets that can be communicated via network 106 via ethernet switch 312. TDM engine 310 also receives Ethernet packets from network 106 and converts then into TDM signals to control field devices connected with slots 308a-g. Configuration bus 307 programs the modules connected with slots 308a-g and retrieves data from those modules. Slot Ethernet bus 318 is used for programming and monitoring modules that communicate via an Ethernet protocol. Such modules may include field devices equipped to use protocols such as Ethernet/IP that send and receive industrial data and commands via Ethernet packages.

CPU 302 runs code stored in random access memory 304 and flash memory 306 to perform the functions of the multiplexer 300. Code run by CPU 302 may include a module manager that programs and monitors devices connected via slots 308a-g. Code may also include a TDM manager to program and monitor the TDM engine 310 and an Ethernet manager to program, monitor, and operate Ethernet switch 312. CPU 302 and TDM engine 310 communicate with Ethernet switch 312 via the CPU ethernet connection 320 and TDM Ethernet connection 322, respectfully. Code may also include an SNMP manager to monitor and manage communication between and among multiplexers 112, 114, 116, 118 and administrative computer 108. The SNMP manager receives read and write requests from the network management software 54 discussed with respect to FIG. 2.

CPU 302 may be the same as CPU 46 described above with respect to system 200. In which case, CPU 302 both controls the multiplexer 300 and authenticates users accessing the network. Alternatively, multiplexer 300 may include a separate system authentication device 200 with its own CPU and components as described above with respect to FIG. 2.

As discussed with respect to FIG. 2, the authentication device 200, which may be implemented using CPU 302, or may be a separate computer system within multiplexer 300, includes token generator module 56 and token authenticator module 58. Generator 56 and authenticator 58 may be implemented as a secure lockdown manager code run by CPU 302 to send and receive tokens with other elements of network 106 including other multiplexers 112, 114, 116, 118 and administrative computer 108. According to a preferred embodiment, tokens are encrypted. By default, the secure lockdown manager 60 places the multiplexer in secure lockdown mode. In this mode, no modifications to the software by any device outside of network 106. This secures the multiplexer network from unauthorized modifications to the multiplexer software, firmware, or settings and to prevent unauthorized operations or modifications to field devices.

FIG. 4 is shows a multiplexer 300 according to one embodiment of the invention. The multiplexer 300 includes a keypad 350 built into the multiplexer housing for inputting a physical authentication code by a person located at the multiplexer. The multiplexer 300 may be connected with a portable computer 354 via a port 352 for initial programming and maintenance. Port 352 may be the USB port 314 discussed above with respect to FIG. 3. To assure security of the multiplexer 300, the interface with the computer 354 may be limited to prevent the technician from modifying software in a manner that could compromise the security of the device. According to one embodiment, where the multiplexer 300 operates using the Linux operating system, the computer 354 may be prevented from accessing the multiplexer via a Linux prompt command line.

Secure lockdown interface 316 connects the CPU 302 with an authentication device 20, discussed above. The authentication device 20 may be a pushbutton or toggle switch that provides assurance that a trusted person is near to the multiplexer or may be a biometric sensor or other physical authentication device that both identifies the trusted individual and assures that the individual is proximate to the multiplexer 300.

As will be described below, when a user has been physically authenticated, the secure lockdown manager 60 takes the multiplexer out of secure lockdown mode, allowing access to data and changes to be made to software and firmware for that multiplexer. The secure lockdown manager 60 may cause the network manager to generate a token using the token generator 56. The generated token may be encrypted and sent, via network 106, to the administrative computer 108 and/or to other multiplexers 112, 114, 116, 118. According to one embodiment, once an operator has provided authentication via a multiplexer, that multiplexer sends a signal to the administrative computer 108 and a token is created by the administrative computer 108 and sent to one or more of the multiplexers 112, 114, 116, 118. According to a preferred embodiment, the encrypted token is created by a multiplexer on network 106 and sent only to other multiplexers on network 106 and can only be decrypted by other multiplexers and not by the administrative computer 108. In this embodiment, security of the network is enhanced because encrypted tokens remain behind firewall 110. When a token is received by a multiplexer via network 106, the receiving multiplexer decrypts the token and authenticates it using the token authenticator 58. Once the token is authenticated, the receiving multiplexer is take out of secure lockdown mode so that modifications to it can be made.

According to one embodiment of the disclosure, tokens include a time limit, for example, 30 minutes. At the expiration of the time limit, the secure lockdown manager 60 places the device in secure lockdown mode. The secure lockdown manager 60 may also include an override timer that restores the receiving to a device to secure lockdown mode after a predetermined time, for example, one hour. The override timer assures that regardless of the token time limit, the device will not remain in an unsecured condition indefinitely.

Figure 5A:
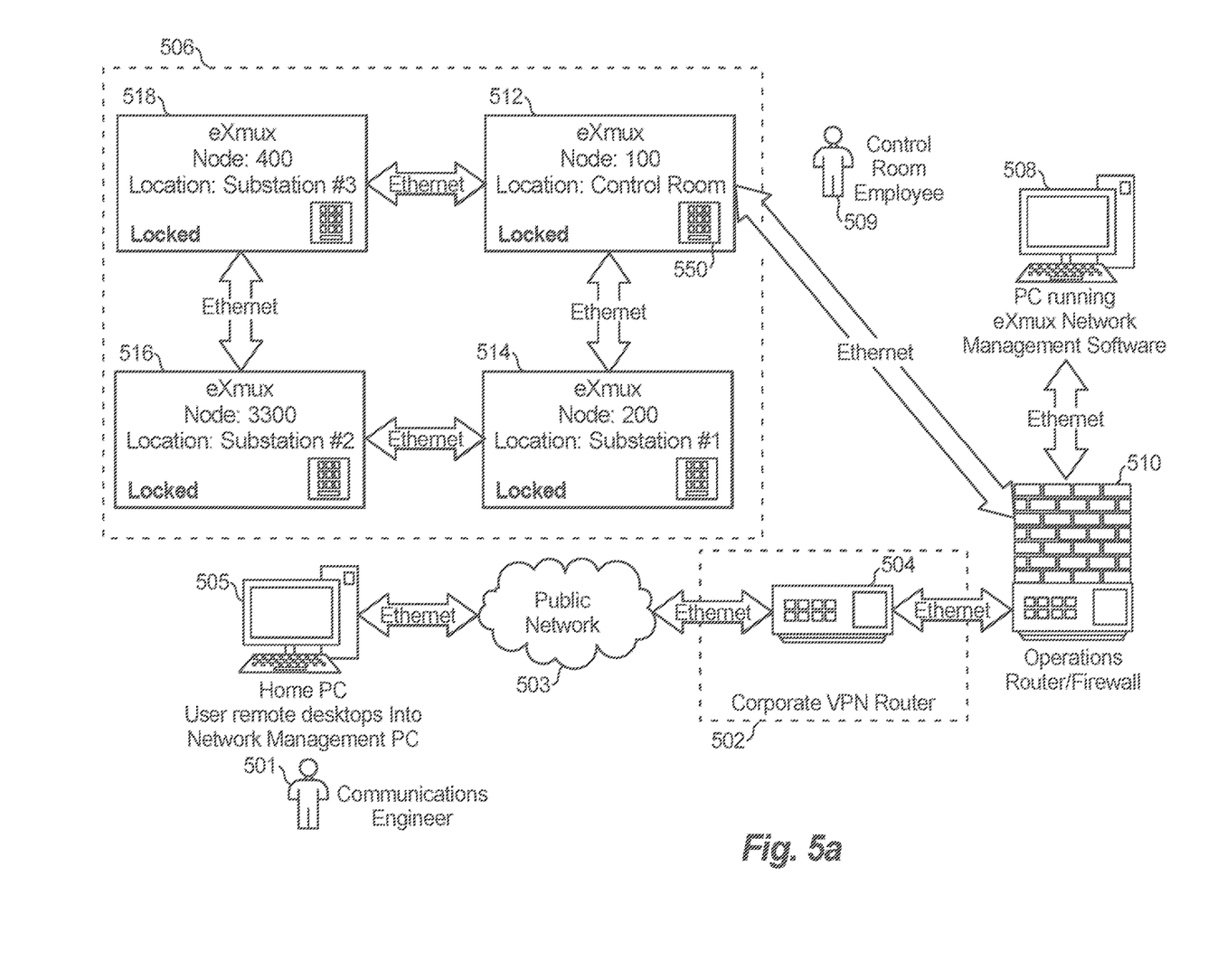
FIGS. 5a-c show a network of multiplexers being accessed according to an embodiment of the disclosure.
Figure 5B:
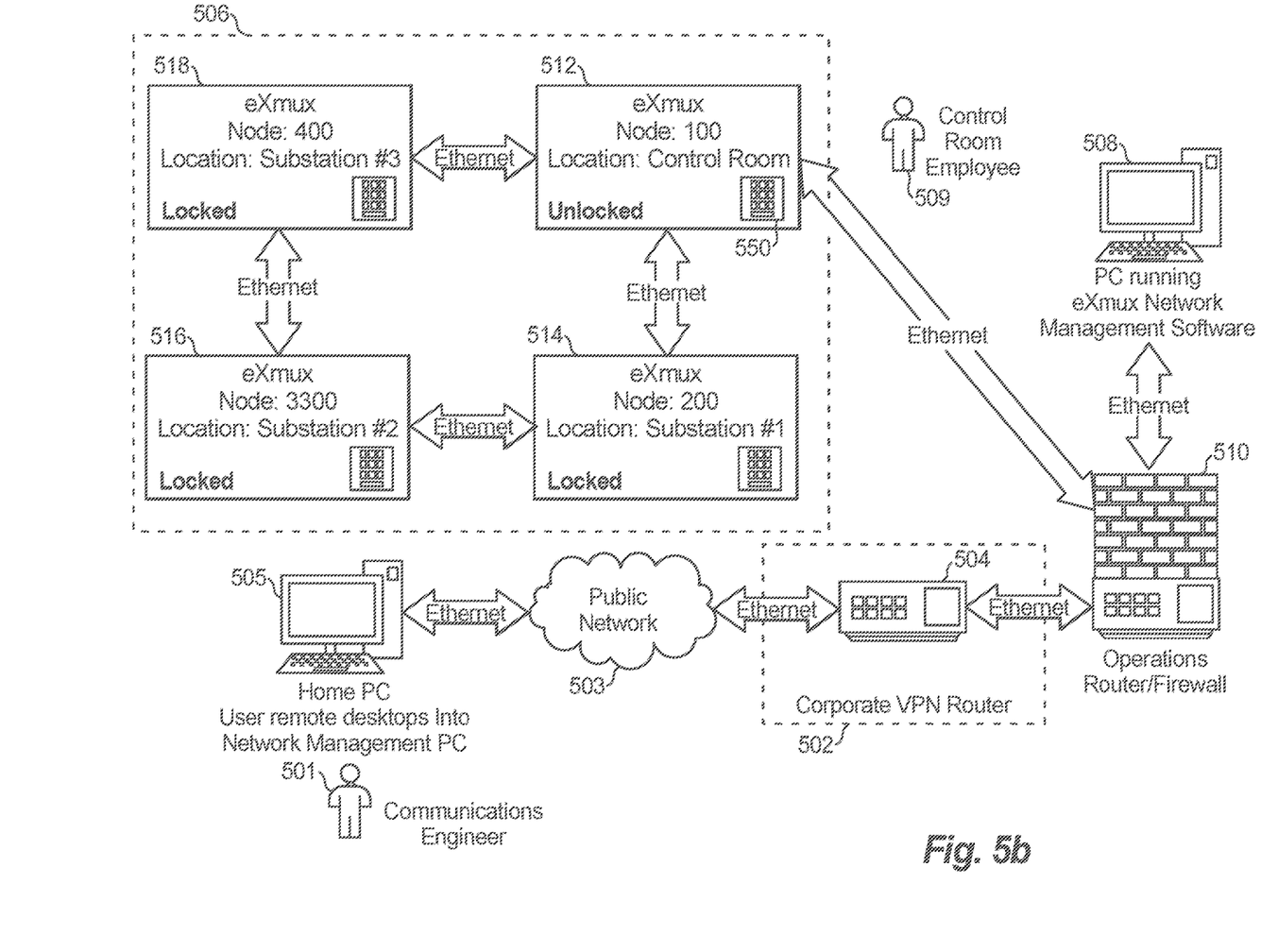
Figure 5C:
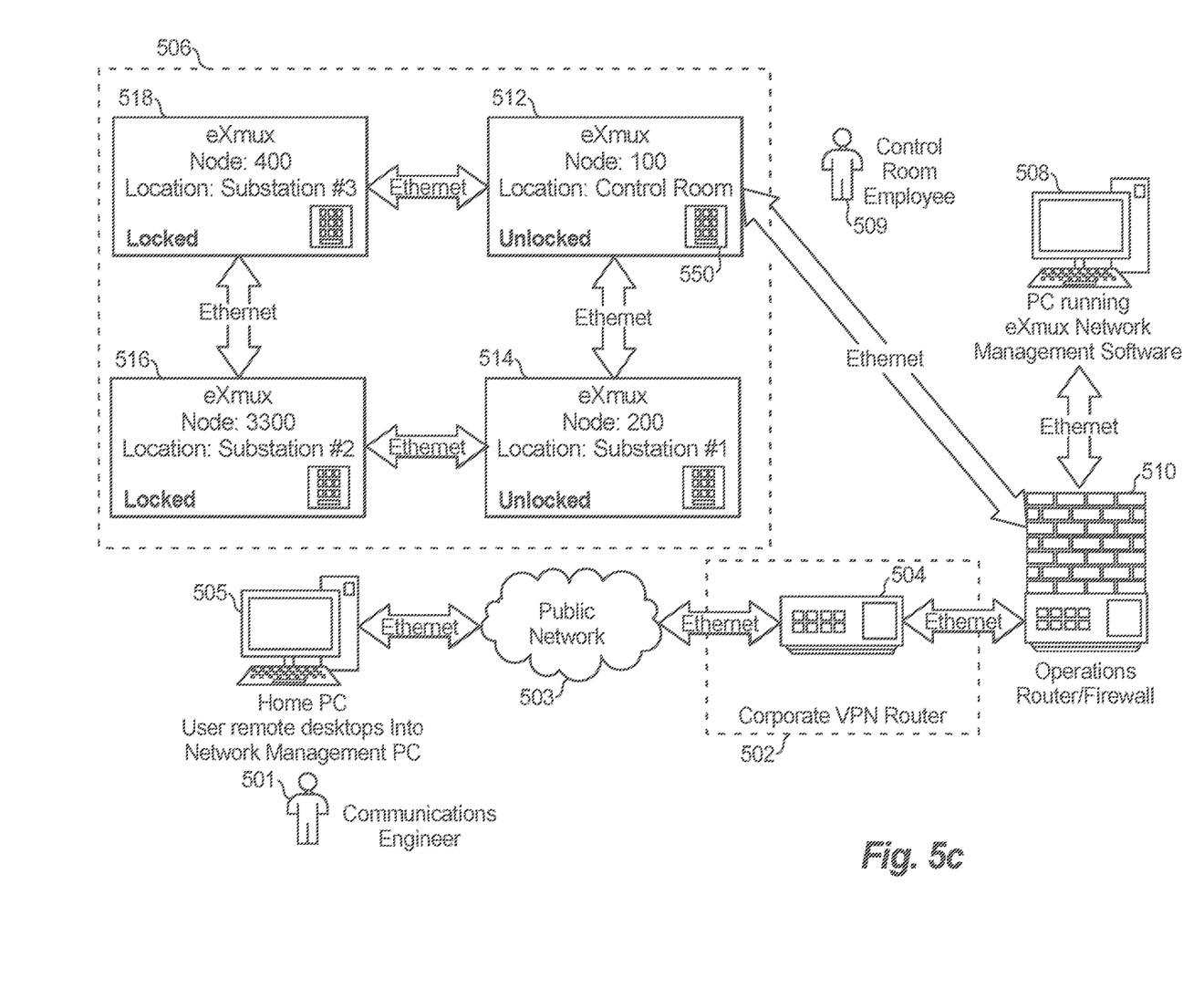

FIGS. 5a-c illustrate an exemplary process for modifying devices on a network according to an embodiment of the disclosure. The network is used to operate an infrastructure system such as an electrical distribution grid. Multiplexer 512 is located at the control room of the distribution grid. Multiplexers 514, 516, 518 are located at substations on the grid that are remote from the control room. One or more industrial field devices may be connected with multiplexers 512, 514, 516, 518. In addition, the multiplexers include configurable interfaces to allow communication, such as telephony, between multiplexers across network 106.

As shown in FIG. 5a, multiplexers 512, 514, 516, 518 are connected as a network 506 via Ethernet connections in a ring configuration. The network 506 is connected, via firewall 510, to a corporate virtual private network (VPN) 502, represented here by a VPN router 504. Other devices such as computers, routers, printers, and devices may also be connected to corporate network 502. VPN 502 may be a corporate computer network, such as network 102 shown in FIG. 1.

Located in the control room is an administrative computer 508 running network management software. The administrative computer 508 connects to the multiplexer network 506 and corporate network 502 via firewall 510. A control room employee 509 has physical access to the administrative computer 508 and control room multiplexer 512. The corporate VPN 502 is accessible remotely via a network 503, which could be a public network such as the Internet. A remote computer 505, operated by a communications engineer 501, is also connected to corporate VPN 502 via the public network 503.

In this example, it is assumed that the utility company that operates the electrical distribution grid would like to add a new DSO synchronous circuit between multiplexer 512 located at the control room and multiplexer 514 located at a remote substation. As shown in FIG. 5a, each multiplexer 512, 514, 516, 518 are "locked," that is, in secure lockdown mode.

The communications engineer 501 logs on to computer 505 and remotely connects with the corporate VPN network 502 via public network 503. The engineer provides login information, for example, a username and password. The communications engineer then connects to the administrative computer 508 via firewall 510. As discussed above, firewall 510 will prevent communication received from devices that are not on a list of known IP addresses. The administrative computer 508 may require the engineer to provide further credentials, for example, another password to access network management software running the network management application on the administrative computer 508.

The communications engineer 501 then may enter another password to log onto one or more of the multiplexers 512, 514, 516, 518 using the network management application. According to one embodiment, the engineer's ID and password for each multiplexer is the same in which case the engineer can log into all of the multiplexers at the same time in one step. According to another embodiment, different login information is required for each multiplexer and the engineer 510 logs into each individual multiplexer that is required to perform a task. In this example, a connection is being established between just two of the multiplexers and the engineer may log into only multiplexers 112 and 114.

The communications engineer 501 then contacts the control room employee 509 physically located near multiplexer 512. For example, the engineer 501 could place a telephone call to the control room employee 509 or the engineer 501 could establish a video conference session. The control room employee confirms the identity of the engineer 501 based on recognizing his or her voice, video image, or other identifying information.

Once the engineer 501 has be positively identified by the technician 509, the technician uses the physical authentication device 550 connected with multiplexer 512 in the control room to authenticate him- or herself. According to one embodiment, where the authentication device 550 is a keypad connected with multiplexer 512, the control room employee enters a password code. Where the device 550 includes a biometric sensor, for example, a fingerprint scanner, the control room employee provides his or her fingerprint. If the password code and/or biometric information matches previously stored information for employee 509, the secure lockdown manager of multiplexer 60, as shown in FIG. 2, takes that device out of secure lockdown mode for a predetermined time period. As shown in FIG. 5b, multiplexer 512 is now "unlocked" and will remain so for that time period. This provides a period of time where the engineer can make changes to that multiplexer.

The secure lockdown manager may also generate a token with an expiration time. The token can be used to unlock one or more of the other multiplexers 514, 516, 518 on the network. In this example, because changes need to be made to both multiplexer 512 and multiplexer 514, the secure token is one that unlocks only multiplexer 514.

The multiplexer 512 then transmits data to the administrative computer 508 that the token has been generated. Administrative computer 508 running the network management software informs the communication engineer 501 that the secure lockdown has been removed from multiplexer 512.

According to one embodiment, the communication engineer 501 then retrieves the unlock token from multiplexer 512 and instructs the administrative computer 508 to send it to multiplexer 514. According to another, more preferred embodiment, the token is not transmitted to the administrative computer 508, but is sent via network 506 directly from multiplexer 512 to multiplexer 514. This avoids exposing the secure token outside of network 506 where it might be intercepted and used by a hacker. Multiplexers 512 and 514 will be unlocked until the time limit of the token expires or until the time limit of the override timer is reached.

Once the multiplexers 512, 514 are unlocked, as shown in FIG. 5c, the communication engineer can modify the firmware to install the new DSO synchronous circuit between the multiplexers. When the change has been made, the communication engineer sends a message to the multiplexers 512, 514 setting them to the secure lock-down mode before the unlock token expires through the network management application. The configuration of the system returns to the state shown in FIG. 5a with all multiplexers in secure lockdown mode.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An industrial control system comprising:
   a plurality of interconnected multiplexers forming a network, each multiplexer having a secure lock-down mode for preventing changes to a setting of the multiplexer;
   a physical authentication device for indicating a physical presence of a person proximate to a control multiplexer, the control multiplexer being one of the plurality of multiplexers; and
   a token generator adapted to generate a token for instructing at least one selected multiplexer to exit the secure lock-down mode to allow a user to make a change to the setting of the at least one selected multiplexer.

2. The control system of claim 1, further comprising:
   a network management computer running a network management application having a first user authentication module for authenticating the user; and
   a firewall electrically coupled to the network and adapted to communicate with the plurality of multiplexers and the network management computer, wherein the token is communicated between one or more multiplexers of the network and is not communicated through the firewall to the network management computer.

3. The control system of claim 2, wherein the user is remote from the network of multiplexers and communicates with one or more multiplexers on the network via a user computer connected to a communication network, via the network management computer, and via the firewall.

4. The control system of claim 2, wherein the network management computer comprises a portion of a Supervisory Control and Data Acquisition System (SCADA).

5. The control system of claim 1, wherein the physical authentication device comprises an identification device to identify the person as a trusted individual.

6. The control system of claim 5, wherein the identification device comprises a biometric sensor.

7. The control system of claim 6, wherein the biometric sensor is one or more of a fingerprint sensor, a retina pattern sensor, an iris pattern sensor, a vein pattern sensor, a hand geometry sensor, an earlobe geometry sensor, a voice pattern analyzer, a DNA analyzer, a handwriting analyzer, a signature analyzer, and a facial recognition sensor.

8. The control system of claim 5, wherein the physical authentication device comprises one or more of a Universal Serial Bus (USB) key fob type device, a serial port device, a parallel port device, and a proprietary cable.

9. The control system of claim 1, wherein the token is encrypted.

10. The control system of claim 1, wherein the token comprises a time limit instructing the selected multiplexer to reenter secure lockdown mode after a first predetermined period of time.

11. The control system of claim 1, wherein each multiplexer further comprises a default timer, the default timer controlling the multiplexer to reenter secure lockdown mode after a second predetermined period of time.

12. The control system of claim 1, wherein the physical authentication device is physically connected with the control multiplexer.

13. The control system of claim 1, wherein the plurality of multiplexers are interconnected with one another by multiple connection paths to form a ring arrangement, a grid arrangement, or a combination of ring and grid arrangements.

14. The control system of claim 1, wherein at least one of the plurality of multiplexers comprises:
   a processor electrically coupled to program memory, the program memory storing program instructions executable by the processor for placing the multiplexer into and out of a secure lock-down mode;
   a physical authentication device electrically coupled to the processor and adapted to receive identifying data from the person proximate the multiplexer; and
   a data memory electrically coupled to the processor, the data memory including authentication data, wherein the processor determines whether the person is a trusted person by comparing the authentication data with the identifying data, wherein when the person is identified as a trusted individual the processor places the multiplexer out of the secure lock-down mode.

15. A multiplexer comprising:
   a processor electrically coupled to a program memory, the program memory storing program instructions executable by the processor for placing the multiplexer into and out of a secure lock-down mode;
   a physical authentication device electrically coupled to the processor and adapted to receive identifying data from an individual proximate the multiplexer; and
   a data memory electrically coupled to the processor, the data memory including authentication data, wherein the processor determines whether the individual is a trusted individual by comparing the authentication data with the identifying data, wherein when the individual is identified as a trusted individual the processor places the multiplexer out of the secure lock-down mode.

16. The multiplexer of claim 15, further comprising a network interface electrically coupled to the processor, the network interface adapted to communicate with an external device over a computer network, wherein the program instructions further comprise instructions executable by the processor for generating a token and communicating the token across the network via the network interface.

17. The multiplexer of claim 16, wherein the external device is a second multiplexer connected with the computer network, wherein the second multiplexer comprises a token authenticator, wherein the token generated by the processor of the first multiplexer is received by the second multiplexer and authenticated by the token authenticator, and wherein the second multiplexer is placed out of the secure lock-down mode.

18. The multiplexer of claim 16, further comprising an external network, wherein the network interface receives signals from a remote user via the external network, wherein the remote user provides log-on information to the multiplexer, wherein the program instructions further comprise instructions executable by the processor to receive the log-on information and allow the remote user to log onto the multiplexer, wherein, when the multiplexer is in the secure lock-down mode the remote user is prevented from modifying the program instructions, and wherein, when the multiplexer is placed out of the secure lock-down mode the remote user can modify the program instructions.

19. The multiplexer of claim 15, wherein the physical authentication device comprises a biometric sensor.

20. The multiplexer of claim 19, wherein the biometric sensor is one or more of a fingerprint sensor, a retina pattern sensor, an iris pattern sensor, a vein pattern sensor, a hand geometry sensor, an earlobe geometry sensor, a voice pattern analyzer, a DNA analyzer, a handwriting analyzer, a signature analyzer, and a facial recognition sensor.

21. The multiplexer of claim 15, wherein the physical authentication device comprises one or more of a Universal Serial Bus (USB) key fob type device, a serial port device, a parallel port device, and a proprietary cable.

22. The multiplexer of claim 15, wherein the program instructions further comprise instructions executable by the processor for placing the multiplexer into the secure lock-down mode after the expiration of a first predetermined period of time.

23. The multiplexer of claim 15, wherein the token includes a time limit, and wherein, when the second multiplexer is placed out of the secure lock-down mode after receiving and authenticating the token, the second multiplexer is placed in the secure lock-down mode after the expiry of the time limit.

24. The multiplexer of claim 15, further comprising a housing and wherein the physical authentication device is physically connected with the housing.

25. The multiplexer of claim 15, wherein the program instructions further comprise a Supervisory Control and Data Acquisition system.

\* \* \* \* \*